US012179317B1

(12) United States Patent
Low et al.

(10) Patent No.: US 12,179,317 B1
(45) **Date of Patent: *Dec. 31, 2024**

(54) NESTED LOCKNUT WRENCH WITH MAGNETIC HOLD

(71) Applicant: Klein Tools, Inc., Lincolnshire, IL (US)

(72) Inventors: Jonathan Low, Fort Worth, TX (US); Peter Roberts, Weatherford, TX (US); Juan Caro, Grand Prairie, TX (US)

(73) Assignee: Klein Tools, Inc., Lincolnshire, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/410,454

(22) Filed: Jan. 11, 2024

Related U.S. Application Data

(63) Continuation of application No. 18/217,350, filed on Jun. 30, 2023.

(51) Int. Cl.
*B25B 13/50* (2006.01)
*B25B 13/56* (2006.01)

(52) U.S. Cl.
CPC .............. *B25B 13/50* (2013.01); *B25B 13/56* (2013.01)

(58) Field of Classification Search
CPC ................................ B25B 13/50; B25B 13/56
USPC .......................................................... 81/176.1
See application file for complete search history.

(56) References Cited

U.S. PATENT DOCUMENTS

| | | | | |
|---|---|---|---|---|
| 942,993 | A * | 12/1909 | Aronson | B25B 13/08 81/184 |
| 1,512,559 | A * | 10/1924 | Moore | B25B 13/16 81/177.1 |
| 1,847,203 | A * | 3/1932 | Zerver | B25B 13/56 24/336 |
| 2,083,131 | A * | 6/1937 | Tornebohm | B25B 13/56 7/138 |
| D406,993 | S * | 3/1999 | Jones | D8/28 |
| 6,745,648 | B2 * | 6/2004 | Stier | B25B 13/08 81/176.1 |
| 7,328,636 | B2 * | 2/2008 | Camacho | B25B 13/10 81/439 |
| 10,882,163 | B2 * | 1/2021 | Sweeney | B25B 13/50 |
| 2010/0293721 | A1 * | 11/2010 | James | B25B 13/04 7/138 |
| 2012/0174718 | A1 * | 7/2012 | James | B25B 13/08 81/177.1 |

* cited by examiner

*Primary Examiner* — Hadi Shakeri

(57) ABSTRACT

A nested locknut wrench system includes a first wrench and a second wrench. Each wrench has a base portion having a flat portion including at least one magnet. Each wrench has a first extension portion extending perpendicularly from a first end of the base portion. Each wrench has a first arc-shaped finger extending perpendicularly from the first extension portion and having a first hook member extending radially inward from the first arc-shaped finger. Each wrench has a second extension portion extending perpendicularly from a second end of the base portion opposite the first end. Each wrench has a second arc-shaped finger extending perpendicularly from the second extension portion and having a second hook member extending radially inward from the second arc-shaped finger.

19 Claims, 6 Drawing Sheets

NESTED LOCKNUT WRENCH WITH MAGNETIC HOLD

CROSS-REFERENCE TO RELATED APPLICATIONS

This patent application is a continuation of U.S. patent application Ser. No. 18/217,350 filed on Jun. 30, 2023, the entire contents of which is herein incorporated by reference.

BACKGROUND OF THE DISCLOSURE

The present disclosure relates to wrenches and, more specifically, to nesting locknut wrenches. Conventional locknut wrenches consist of a two-sided wrench with a fixed jaw at either end designed to engage with a locknut's outer surface to tighten or loosen the locknut.

Locknuts are oftentimes used to connect electrical conduit to electrical boxes or connectors. These electrical boxes oftentimes present confined spaces, increasing the difficulty of using a traditional locknut wrench. Conventional locknut wrenches are often designed for use with a single locknut size, forcing users to carry multiple locknut wrenches to match to the locknut often present challenges when working with locknuts in confined spaces or when working with locknuts of different sizes. It is desirable to provide a locknut wrench system to overcome these issues, allowing a user to quickly and easily tighten or loosen locknuts of various sizes in confined spaces.

BRIEF SUMMARY OF THE DISCLOSURE

In accordance with one feature of this disclosure, a nested locknut wrench system is provided. The nested locknut wrench includes a first wrench and a second wrench. Each wrench has a base portion having a flat portion including at least one magnet. Each wrench has a first extension portion extending perpendicularly from a first end of the base portion, and a first arc-shaped finger extending perpendicularly from the first extension portion and having a first hook member extending radially inward from the first arc-shaped finger. Each wrench has a second extension portion extending perpendicularly from a second end of the base portion opposite the first end, and a second arc-shaped finger extending perpendicularly from the second extension portion and having a second hook member extending radially inward from the second arc-shaped finger.

In one feature, when the flat portion of the base of the first wrench is stacked on top of the flat portion of the base of the second wrench, the at least one magnet of the first wrench or the second wrench retains the first wrench to the second wrench.

As one feature, the nested locknut wrench system includes a third wrench. The third wrench includes a second base portion having a second flat portion including at least one magnet, a third extension portion extending perpendicularly from a third end of the second base portion, and a third arc-shaped finger extending perpendicularly from the third extension portion and having a third hook member extending radially inward from the third arc-shaped finger. The third wrench includes a fourth extension portion extending perpendicularly from a fourth end of the base portion opposite the third end, and a fourth arc-shaped finger extending perpendicularly from the fourth extension portion and having a fourth hook member extending radially inward from the fourth arc-shaped finger.

In another feature, the first wrench is a 1 inch locknut wrench, the second wrench is a 0.75 inch locknut wrench, and the third wrench is a 0.5 inch locknut wrench.

According to one feature, the first extension portion and the second extension portion extend in opposite directions from the base portion.

In yet a further feature, the base portion comprises a handle.

In one feature, the base portion has a first magnet adjacent to the first extension portion and a second magnet adjacent to the second extension portion.

In accordance with one feature of this disclosure, a nested locknut wrench system is provided. The nested locknut wrench system includes a first wrench and a second wrench. Each wrench has a base portion having a flat portion including at least one magnet. Each wrench has a first end portion extending from the base portion, the first end portion including a first arc-shaped finger offset from the base portion and having a first hook member extending radially inward from the first arc-shaped finger. Each wrench has a second end portion extending from the base portion, opposite the first end portion, the second end portion including a second arc-shaped finger offset from the base portion and having a second hook member extending radially inward from the second arc-shaped finger.

As one feature, when the flat portion of the base of the first wrench is stacked on top of the flat portion of the base of the second wrench, the at least one magnet of the first wrench or the second wrench retains the first wrench to the second wrench.

In one feature, the first end portion includes a first extension portion extending perpendicularly and between the base portion and the first hook member, and the second end portion includes a second extension portion extending perpendicularly and between the base portion and the second hook member.

In another feature, the first end portion and the second end portion extend in opposite directions from the base portion.

According to one feature, the nested locknut wrench system further includes a third wrench. The third wrench has a second base portion having a flat portion including at least one magnet. The third wrench has a third end portion extending from the base portion, the third end portion including a third arc-shaped finger offset from the second base portion and having a third hook member extending radially inward from the third arc-shaped finger. The third wrench has a fourth end portion extending from the base portion, opposite the third end portion, the fourth end portion including a fourth arc-shaped finger offset from the second base portion and having a fourth hook member extending radially inward from the fourth arc-shaped finger.

In accordance with one feature of this disclosure, a nested locknut wrench system is provided. The nested locknut wrench system includes a first wrench and a second wrench. Each wrench has an elongated base portion extending along a first plane and having a first magnet adjacent a first end of the base portion and a second magnet adjacent a second end of the base portion opposite the first end. Each wrench has a first extension portion extending, along a second plane perpendicular to the first plane, from the first end of the base portion. Each wrench has a first arc-shaped finger extending, along a third plane perpendicular to the second plane and parallel to the first plane, from the first extension portion and having a first hook member extending radially inward from the first arc-shaped finger. Each wrench has a second extension portion extending, along a fourth plane perpendicular to the first plane, from the second end of the base portion. Each wrench has a second arc-shaped finger extending, along a fifth plane perpendicular to the fourth plane and parallel to the first plane, from the second extension portion and having a second hook member extending radially inward from the second arc-shaped finger.

In one feature, the base portion includes a flat portion having the first magnet and the second magnet.

As one feature, when the base portion of the first wrench is stacked on top of the base portion of the second wrench, the at least one magnet of the first wrench or the second wrench retains the first wrench to the second wrench.

In another feature, the nested locknut wrench system includes a third wrench. The third wrench has a second elongated base portion extending along a sixth plane and having at least one magnet. The third wrench has a third extension portion extending along a seventh plane perpendicular to the sixth plane, from a third end of the second elongated base portion. The third wrench has a third arc-shaped finger extending, along an eighth plane perpendicular to the seventh plane and parallel to the sixth plane, from the third extension portion and having a third hook member extending radially inward from the third arc-shaped finger. The third wrench has a fourth extension portion extending, along a ninth plane perpendicular to the sixth plane, from a fourth end of the base portion opposite the third end. The third wrench has a fourth arc-shaped finger extending, along a tenth plane perpendicular to the ninth plane and parallel to the sixth plane, from the fourth extension portion and having a fourth hook member extending radially inward from the second arc-shaped finger.

As one feature, the base portion of the first wrench, the base portion of the second wrench, and the second elongated base portion of the third wrench each include a flat portion having the at least one magnet. When the base portion of the first wrench is stacked on top of the base portion of the second wrench and the base portion of the second wrench is stacked on top of the second elongated base portion of the third wrench, the first magnet or the second magnet retains the first wrench to the second wrench, and the first magnet or the at least one magnet of the third wrench retains the second wrench to the third wrench.

In another feature, when the first wrench, the second wrench, and the third wrench are stacked and retained to each other with the base portions of each wrench in alignment with each other, the magnets of the first wrench, second wrench, and third wrench are offset from each other.

According to one feature, the first wrench is a 1 inch locknut wrench, the second wrench is a 0.75 inch locknut wrench, and the third wrench is a 0.5 inch locknut wrench.

In yet a further feature, the first plane is between the third plane and the fifth plane.

DETAILED DESCRIPTION OF PREFERRED EMBODIMENTS

Figure 1:
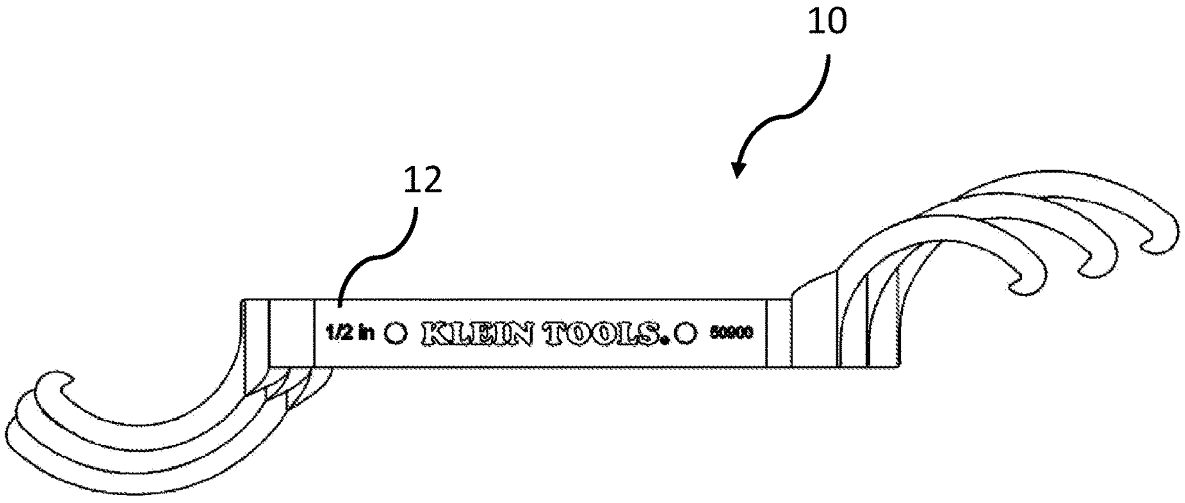
FIG. 1 is a top view of a nested locknut wrench system with magnetic hold.
Figure 2:
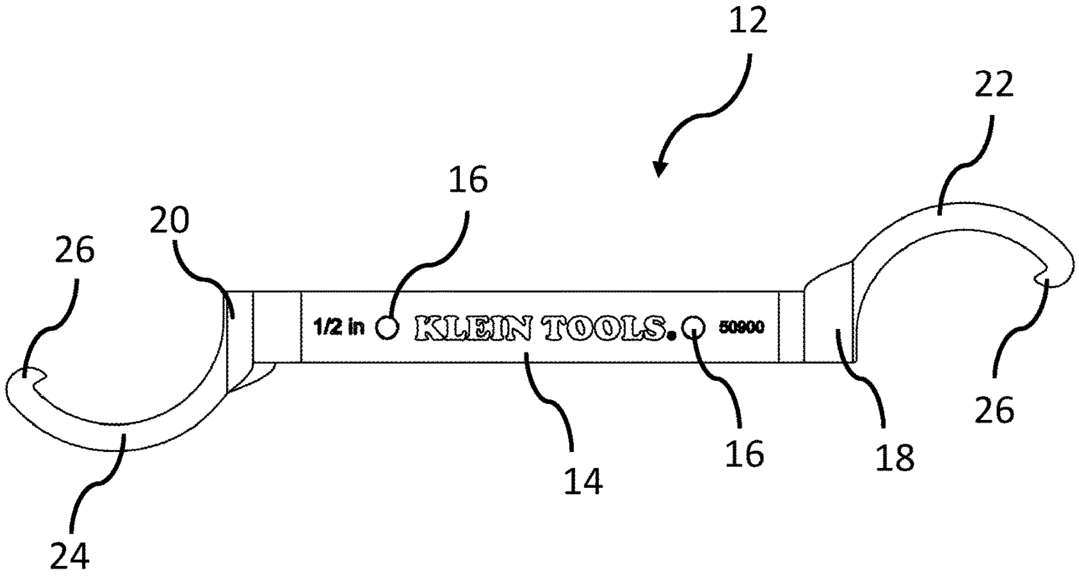
FIG. 2 is a top view of a single locknut wrench of the nested locknut wrench system of FIG. 1.
Figure 3:
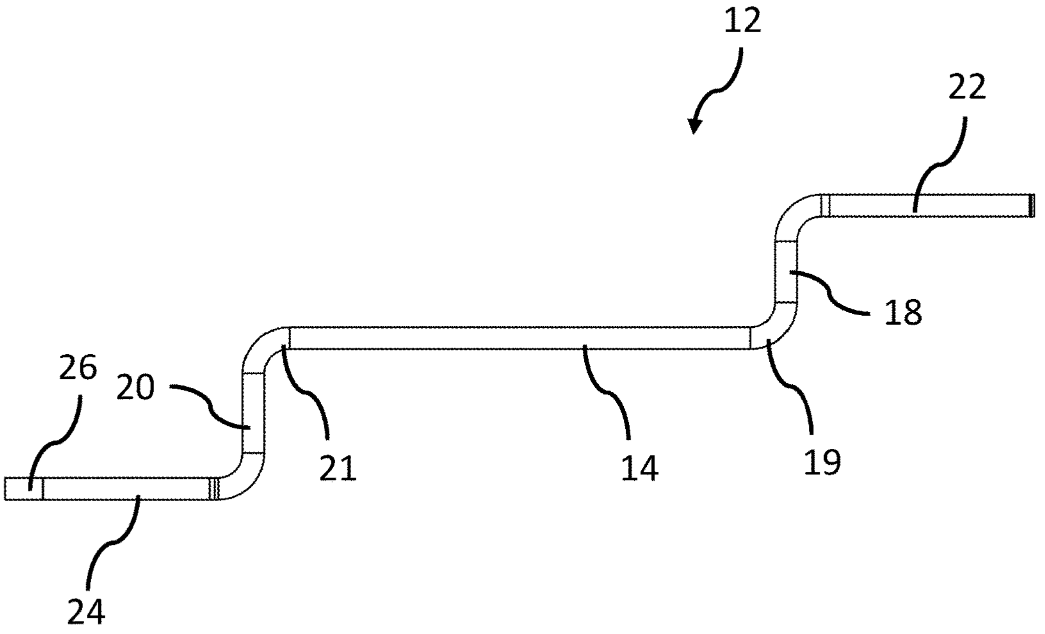
FIG. 3 is a side view of the locknut wrench of FIG. 2.
Figure 4:
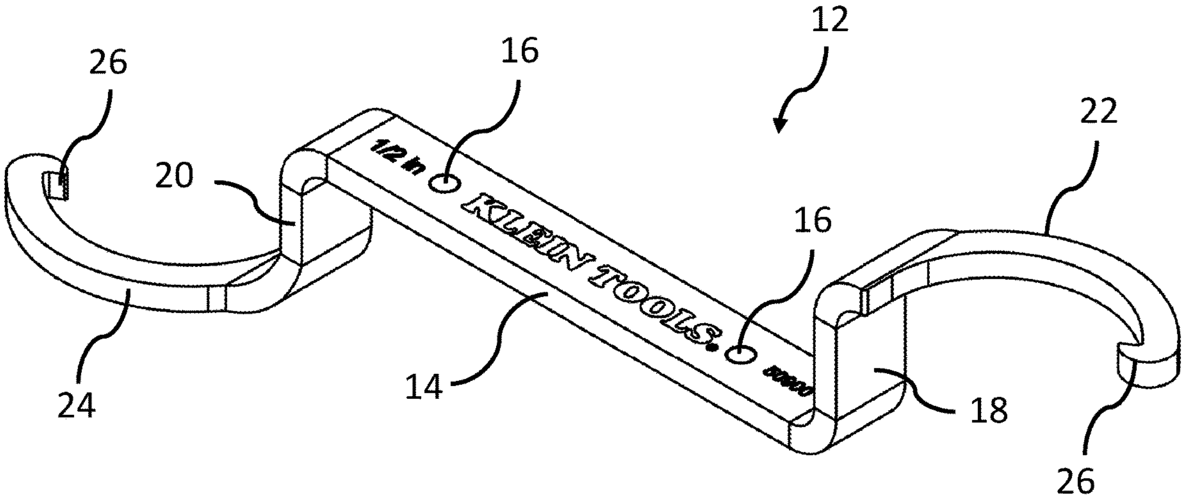
FIG. 4 is a perspective view of the locknut wrench of FIG. 2.

As best seen in FIGS. 1 and 5-10, a nested locknut wrench system 10 is provided. In the illustrated and preferred embodiment, the nested locknut wrench system 10 includes three locknut wrenches 12. As best shown in FIGS. 2-4, each locknut wrench 12 includes an elongated base portion 14 having a pair of magnets 16. In the illustrated and preferred embodiment, each locknut wrench 12 includes a first extension portion 18 extending from a first end 19 of the base portion 14 and a second extension portion 20 extending from a second end 21 of the base portion 14 opposite the first end 19. Each locknut wrench 12 includes a first arc-shaped finger 22 extending from the first extension portion 18 and a second arc-shaped finger 24 extending from the second extension portion 20. In the illustrated and preferred embodiment, each arc-shaped finger 22, 24 has an associated hook member 26 extending radially inward.

Figure 5:
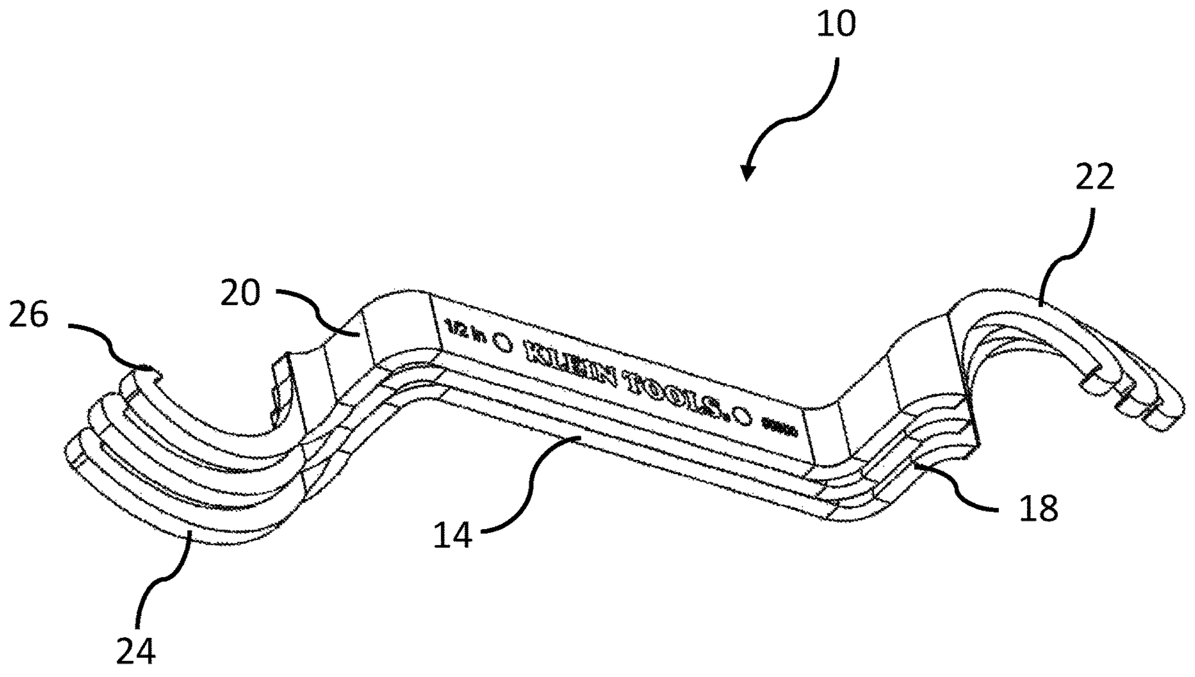
FIG. 5 is a perspective view of the nested locknut wrench system of FIG. 1.
Figure 6:
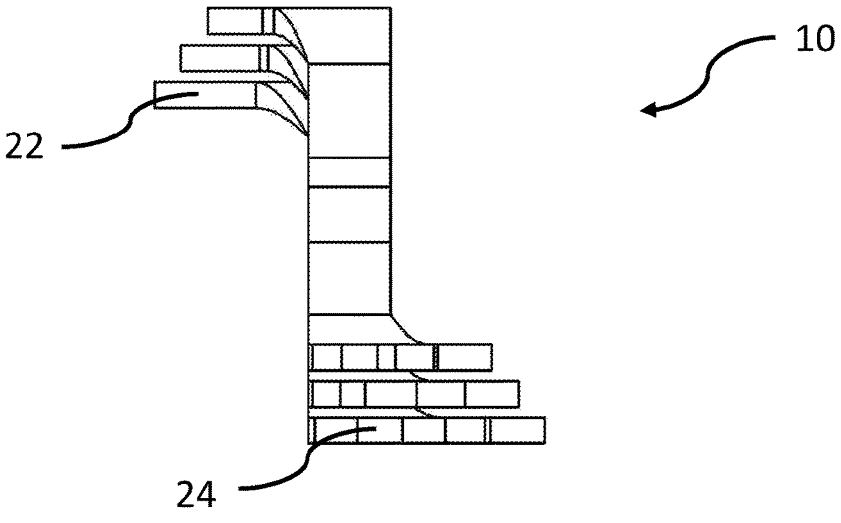
FIG. 6 is a side view of the nested locknut wrench system of FIG. 1.

In the illustrated and preferred embodiment, the elongated base portion 14 is shown in the form of a handle for gripping the locknut wrench 12. The elongated base portion 14 is shown having a flat portion along the length thereof. The flat portion allows for multiple locknut wrenches 12 to be stacked. The illustrated and preferred embodiment includes two magnets 16 along the length of the base portion 14. Any method of attaching the magnets 16 to the base portion 14 may be used (e.g., press fitting, molding, gluing, etc.). In The illustrated and preferred embodiment, the magnets 16 are located at opposite ends of the base portion 14, with one magnet 16 positioned adjacent to the first extension portion 18 and the other magnet 16 positioned adjacent to the second extension portion 20. The magnetetic field provided by the magnets 16 retains the multiple stacked locknut wrenches 12 nested locknut wrench system 10 to each other. While a single magnet 16 may be used, using a pair of magnets 16 helps prevent rotation of the individual locknut wrenches 12 relative to each other, keeping them aligned (e.g., as shown in FIGS. 1, 5, and 6).

In the illustrated and preferred embodiment, the first extension portion 18 extends perpendicular to the length of the base portion 14. As best shown in FIG. 4, the first extension portion 18 extends upwardly and perpendicularly to the base portion 14. The second extension portion 20 also extends perpendicularly to the base portion 14. The second extension portion 20 extends in the opposite direction (e.g., down as shown in FIG. 4) from that of the first extension portion 18. In the illustrated and preferred embodiment, the first extension portion 18 and the second extension portion 20 extend parallel to each other at opposite sides of the length of the base portion 14.

In the illustrated and preferred embodiment, the first arc-shaped finger 22 extends perpendicularly from the first extension portion 18, and the second arc-shaped finger 24 extends perpendicularly from the second extension portion 20. The first arc-shaped finger 22 extends parallel to the second arc-shaped finger 24. Locknuts typically have multiple tabs located around the perimeter thereof to allow for tightening or loosening of the locknut with a locknut wrench. The arc-shaped fingers 22, 24 are shaped to wrap around a locknut and allow the associated hook member 26 to engage a tab of the locknut to tighten or loosen the locknut. In the illustrated and preferred embodiment, the nested locknut wrench system 10 includes three locknut wrenches 12. Multiple locknut wrenches may be needed when encountering locknuts of different sizes. The arc-shaped fingers 22, 24 of each locknut wrench 12 is sized to engage a locknut of a different size (e.g., the radius of the curvature of the arc-shaped fingers 22,24 varies based on the locknut size each locknut wrench 12 is designed for). In the illustrated and preferred embodiment, the locknut wrenches 12 are 1", ¾" and ½" locknut wrenches 12 designed for use with 1", ¾" and ½" locknuts.

Locknuts are often used in confined spaces, such as electrical boxes, that frequently have lips that make accessing the locknuts difficult with a straight locknut wrench. The offset of the arc-shaped fingers 22, 24 and hook members 26 from the base portion 14 provided by the extension portions 18, 20, help overcome this issue by allowing the arc-shaped fingers 22, 24 and hook members 26 to grip the locknut while the base portion 14 clears the lip of the box.

In the illustrated and preferred embodiment, the base portion 14 extends along a first plane. The first extension portion 18 extends along a second plane perpendicular to the first plane of the base portion 14. The first arc-shaped fingers 22 extend along a third plane perpendicular to the second plane of the first extension portion 18 and parallel to the first plane of the of the base portion 14. The second extension portion 20 extends along a fourth plane perpendicular to the first plane of the base portion, parallel to the second plane of the first extension portion 18, and perpendicular to the third plane of the first arc-shaped fingers 22. The second arc-shaped finger 24 extends along a fifth plane perpendicular to the fourth plane of the second extension portion, parallel to the first plane of the base portion, perpendicular to the second plane of the first extension portion, and parallel to the third plane of the first arc-shaped fingers 22. In the illustrated and preferred embodiment, the first plane of the base portion 14 is between the third plane of the first arc-shaped fingers 22 and the fifth plane of the second arc-shaped fingers.

Figure 7:
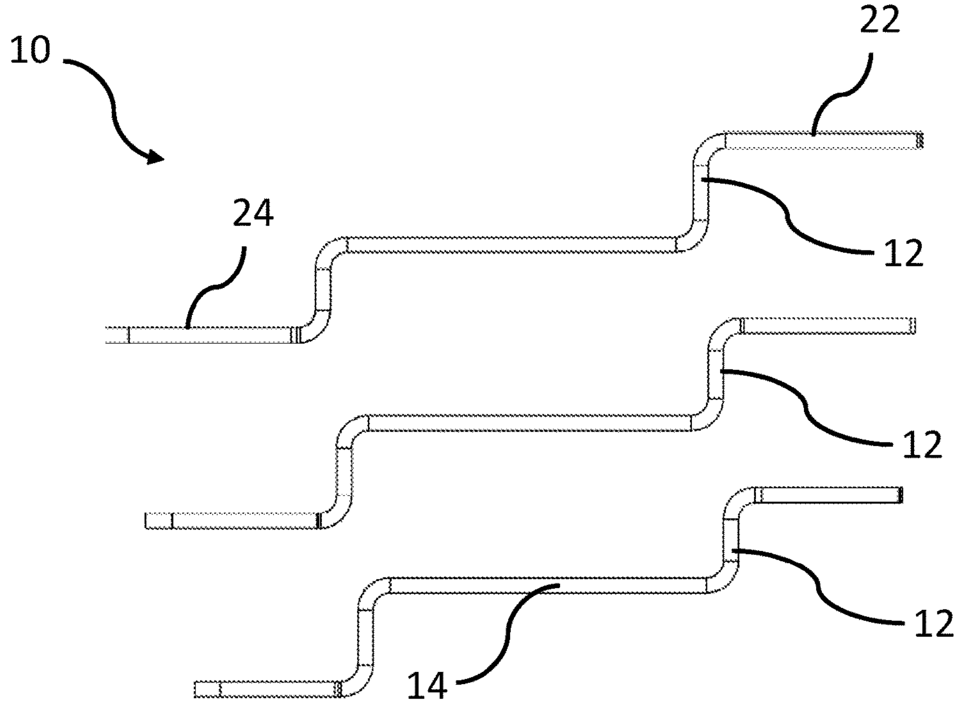
FIG. 7 is a side view of the nested locknut wrench system of FIG. 1 with the locknut wrenches shown un-nested.
Figure 8:
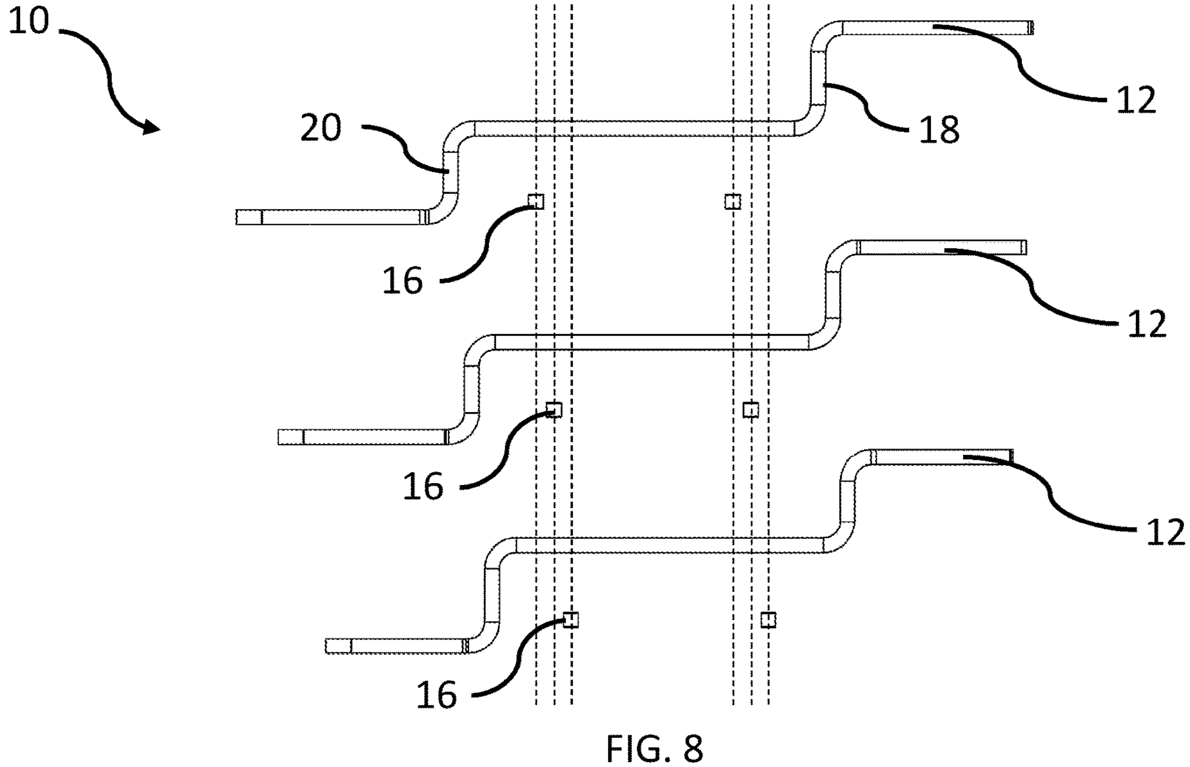
FIG. 8 is an exploded side view of the locknut wrench system of FIG. 1.
Figure 9:
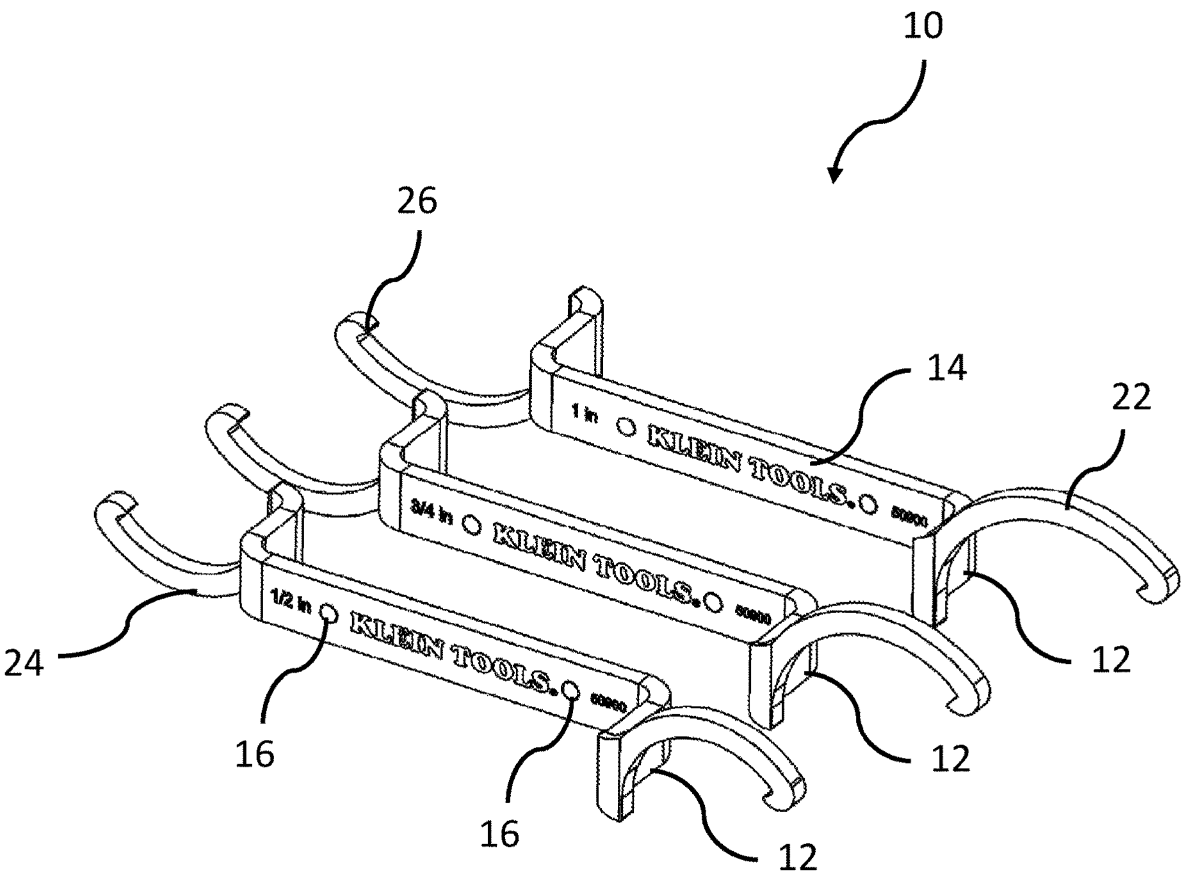
FIG. 9 is a perspective view of the nested locknut wrench system of FIG. 7.
Figure 10:
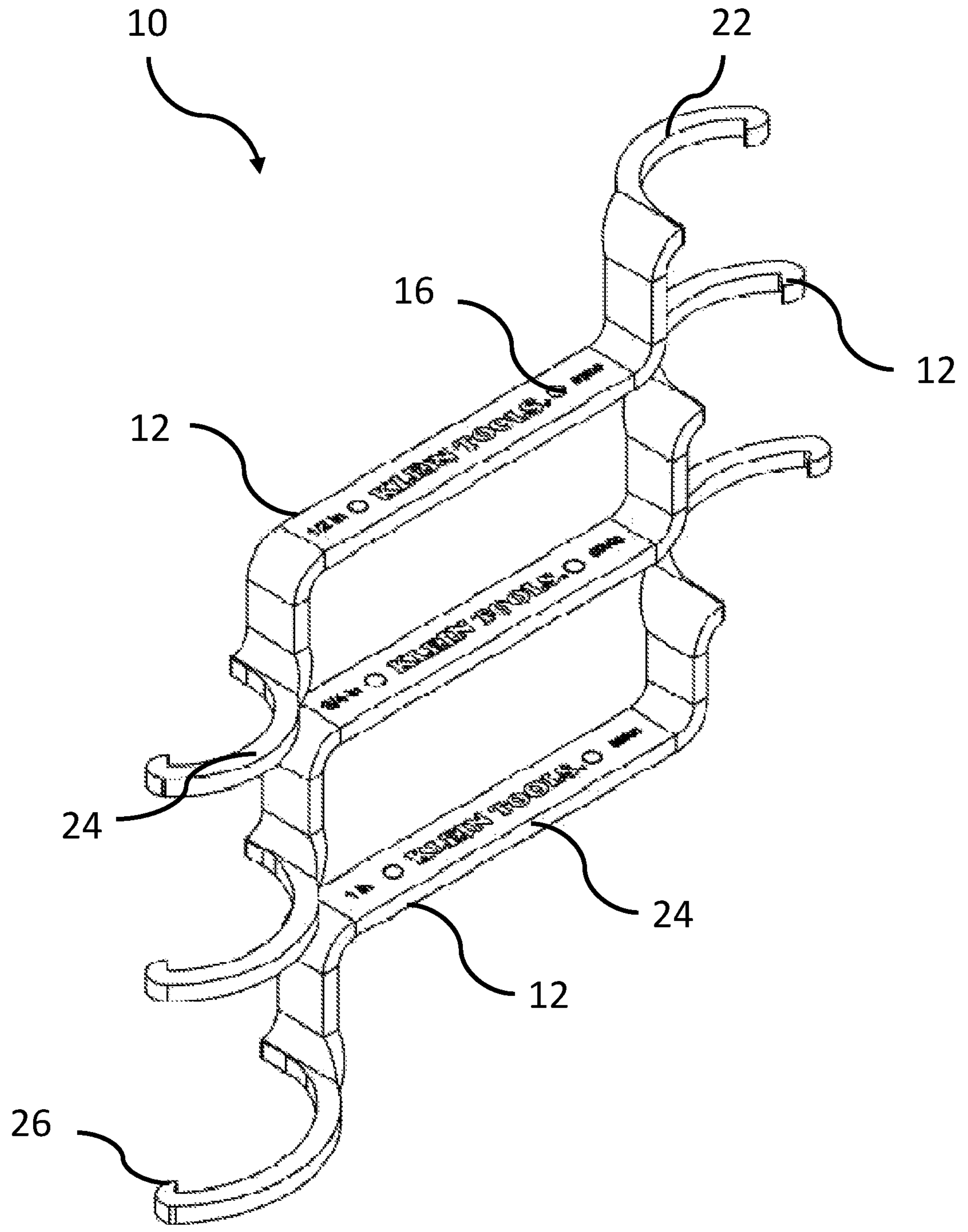
FIG. 10 is another perspective view of the nested locknut wrench system of FIG. 7.

FIGS. 1, 5, and 6 show the nested locknut wrench system 10 having three locknut wrenches 12 nested and retained together by the magnets 16. FIGS. 7 and 8 show a vertically exploded view of the nested locknut wrench system 10, with FIG. 8 having the magnets 16 removed. As best shown in FIG. 8, when the locknut wrenches 12 are nested together, the extension portions 18 and 20 shift each successive locknut wrench 12 to the right when viewed top to bottom (e.g., each locknut wrench 12, when nested, it shifted to the right relative to the locknut wrench 12 above it). This shifts (e.g., offsets) the magnets 16 of each locknut wrench 12 out of alignment with each other.

Preferred embodiments of the inventive concepts are described herein, including the best mode known to the inventor(s) for carrying out the inventive concepts. Variations of those preferred embodiments will become apparent to those of ordinary skill in the art upon reading the foregoing description. The inventor(s) expect skilled artisans to employ such variations as appropriate, and the inventor(s) intend that the inventive concepts can be practiced otherwise than as specifically described herein. Accordingly, the inventive concepts disclosed herein include all modifications and equivalents of the subject matter recited in the claims appended hereto as permitted by applicable law. Moreover, any combination of the above-described elements and features in all possible variations thereof is encompassed by the inventive concepts unless otherwise indicated herein or otherwise clearly contradicted by context. Further in this regard, while highly preferred forms of the nested locknut wrench system 10 are shown in the figures, it should be understood that this disclosure anticipates variations in the specific details of each of the disclosed components and features of the material dispenser and that no limitation to a specific form, configuration, or detail is intended unless expressly and specifically recited in an appended claim.

For example, while specific and preferred forms have been shown for the magnets 16, other magnet locations and numbers may be used. For example, while two magnets 16 are shown, one magnet or three or more magnets may be used. In some examples, a single magnet may be used (e.g., when the using a short base portion 14 or when rotation of the stacked locknut wrenches 12 is not a concern). In some examples a third magnet may be included in the middle of the base portion 14. In some examples, the magnets 16 may be located in the extension portions 18, 20 instead of or in addition to magnets 16 in the base portion 14.

As another example, while the locknut wrench 12 is shown in the form of a two-sided locknut wrench, a single sided locknut wrench having an extension portion, art-shaped finger, and hook member on only one side of the base portion 14 may be used. A dual-sided locknut wrench, for example, may allow a user to use one side for tightening a locknut and the other side for loosening a locknut. In other examples, two single sided locknut wrenches may be used. In some examples, one side may be a locknut wrench, and the other side may be any other open or close ended wrench or tool, many of which are known.

As yet another example, while the locknut wrenches 12 are shown having extension portions 18, 20 creating an offset wrench, in some examples one or both sides of the wrench may not feature the perpendicular extension portions 18, 20. While the extension portions 18, 20 increase the convenience and usability of the locknut wrench 12 in some situations, and aids in alignment of the locknut wrenches 12 when stacking together, some examples may be flat (e.g., the base portion 14 and arc-shaped finger 22, 24 may be in the same plane). In some examples, a locknut wrench may have an extension portion 18 on one end of the base portion (e.g., the extension portion 18 is perpendicular to the base portion 14 and the associated arc-shaped finger 24 is on a different plane than the base portion) and may not have an extension portion on the other side of the base portion 14 (e.g., the associated arc-shaped finger 24 is on the same plane as and/or attached to the base portion 14).

As a further example, while the locknut wrenches 12 are shown having extension portions 18, 20 extend perpendicular (e.g., at a 90 degree angle from) to the 14 base portion, in some examples the extension portions 18, 20 extend at an angle greater or less than 90 degrees (e.g., the offset of the arc-shaped fingers 22, 24 relative to the base portion 14 is achieved by extension portions 18, 20 that are not perpendicular to the base portion 14 and the arc-shaped fingers 22, 24). In some examples, the extension portions 18, 20 form an obtuse angle relative to the base portion 14. In some examples, the extension portions 18, 20 form an acute angle relative to the base portion 14. In some examples, the angle between the base portion 14 and the extension portions 18, 20 is 135 degrees. In various examples, the angle between the base portion 14 and the extension portions 18, 20 is greater than 90 degrees and less than 135 degrees. In some examples, the angle between the base portion 14 and the extension portions 18, 20 is less than 180 degrees. In some examples, the angle between the base portion 14 and the extension portions 18, 20 is 45 degrees. In various examples, the angle between the base portion 14 and the extension portions 18, 20 is greater than 45 degrees and less than 90 degrees.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. The use of any and all examples, or exemplary language (e.g., "such as") provided herein, is intended merely to better illuminate the inventive concepts disclosed herein and does not pose a limitation on the scope of any invention unless expressly claimed. No language in the specification should be construed as indicating any non-claimed element as essential to the practice of the inventive concepts disclosed herein.

What is claimed is:

1. A nested locknut wrench system comprising:
- a first wrench and a second wrench, each of the first wrench and the second wrench having:
  - an elongated base portion having a first magnet adjacent a first end and a second magnet adjacent a second end;
  - a first extension portion extending perpendicularly from the first end of the base portion;
  - a first arc-shaped finger extending perpendicularly from the first extension portion and having a first hook member extending radially inward from the first arc-shaped finger;
  - a second extension portion extending perpendicularly from the second end of the base portion opposite the first end; and
  - a second arc-shaped finger extending perpendicularly from the second extension portion and having a second hook member extending radially inward from the second arc-shaped finger.

2. The nested locknut wrench system of claim 1, wherein, when base portion of the first wrench is stacked on top of the base portion of the second wrench, the first magnet and the second magnet of the first wrench or the first magnet and the second magnet of the second wrench retains the first wrench to the second wrench.

3. The nested locknut wrench system of claim 1, further comprising a third wrench having:
- a second elongate base portion having a third magnet adjacent a third end and a fourth magnet adjacent a fourth end;
- a third extension portion extending perpendicularly from the third end of the second base portion;
- a third arc-shaped finger extending perpendicularly from the third extension portion and having a third hook member extending radially inward from the third arc-shaped finger;
- a fourth extension portion extending perpendicularly from the fourth end of the base portion opposite the third end; and
- a fourth arc-shaped finger extending perpendicularly from the fourth extension portion and having a fourth hook member extending radially inward from the fourth arc-shaped finger.

4. The nested locknut wrench system of claim 3, wherein the first wrench is a 1 inch locknut wrench, the second wrench is a 0.75 inch locknut wrench, and the third wrench is a 0.5 inch locknut wrench.

5. The nested locknut wrench system of claim 3, wherein:
- when the base portion of the first wrench is stacked on top of the base portion of the second wrench, the first magnet and the second magnet of the first wrench or the first magnet and the second magnet of the second wrench retains the first wrench to the second wrench; and
- when the base portion of the third wrench is stacked on top of the base portion of the first wrench, the third magnet and the fourth magnet of the third wrench retains the third wrench to the first wrench or the second wrench.

6. The nested locknut wrench system of claim 1, wherein the first extension portion and the second extension portion extend in opposite directions from the base portion.

7. The nested locknut wrench system of claim 1, wherein the base portion comprises a handle.

8. A nested locknut wrench system comprising:
- a first wrench, a second wrench, and a third wrench, each having:
  - an elongated base portion having a first magnet at a first end and a second magnet at a second end opposite the first end;
  - a first end portion extending from the base portion, the first end portion including a first arc-shaped finger offset from the base portion and having a first hook member extending radially inward from the first arc-shaped finger; and
  - a second end portion extending from the base portion, opposite the first end portion, the second end portion including a second arc-shaped finger offset from the base portion and having a second hook member extending radially inward from the second arc-shaped finger;
- wherein the first end portion includes a first extension portion extending perpendicularly and between the base portion and the first hook member; and
- wherein the second end portion includes a second extension portion extending perpendicularly and between the base portion and the second hook member.

9. The nested locknut wrench system of claim 8, wherein, when the base portion of the first wrench is stacked on top of the base portion of the second wrench, the first magnet and the second magnet of the first wrench or the first magnet and the second magnet of the second wrench retains the first wrench to the second wrench.

10. The nested locknut wrench system of claim 9, wherein, when the base portion of the third wrench is stacked on top of the base portion of the first wrench, the first magnet and the second magnet of the first wrench or the first magnet and the second magnet of the third wrench retains the first wrench to the third wrench.

11. The nested locknut wrench system of claim 8, wherein the first end portion and the second end portion extend in opposite directions from the base portion.

12. A nested locknut wrench system comprising:
- a first wrench and a second wrench, each having:
  - an elongated base portion extending along a first plane and having a first magnet adjacent a first end of the base portion and a second magnet adjacent a second end of the base portion opposite the first end;

a first extension portion extending, along a second plane perpendicular to the first plane, from the first end of the base portion;

a first arc-shaped finger extending, along a third plane perpendicular to the second plane and parallel to the first plane, from the first extension portion and having a first hook member extending radially inward from the first arc-shaped finger;

a second extension portion extending, along a fourth plane perpendicular to the first plane, from the second end of the base portion; and a second arc-shaped finger extending, along a fifth plane perpendicular to the fourth plane and parallel to the first plane, from the second extension portion and having a second hook member extending radially inward from the second arc-shaped finger.

13. The nested locknut wrench system of claim 12, wherein the base portion includes a flat portion having the first magnet and the second magnet.

14. The nested locknut wrench system of claim 13, wherein, when the base portion of the first wrench is stacked on top of the base portion of the second wrench, the at least one magnet of the first wrench or the second wrench retains the first wrench to the second wrench.

15. The nested locknut wrench system of claim 12, further comprising a third wrench having:

a second elongated base portion extending along a sixth plane and having at least one magnet;

a third extension portion extending, along a seventh plane perpendicular to the sixth plane, from a third end of the second elongated base portion;

a third arc-shaped finger extending, along an eighth plane perpendicular to the seventh plane and parallel to the sixth plane, from the third extension portion and having a third hook member extending radially inward from the third arc-shaped finger;

a fourth extension portion extending, along a ninth plane perpendicular to the sixth plane, from a fourth end of the base portion opposite the third end; and a fourth arc-shaped finger extending, along a tenth plane perpendicular to the ninth plane and parallel to the sixth plane, from the fourth extension portion and having a fourth hook member extending radially inward from the second arc-shaped finger.

16. The nested locknut wrench system of claim 15, wherein the first wrench is a 1 inch locknut wrench, the second wrench is a 0.75 inch locknut wrench, and the third wrench is a 0.5 inch locknut wrench.

17. The nested locknut wrench system of claim 15, wherein:

the base portion of the first wrench, the base portion of the second wrench, and the second elongated base portion of the third wrench each include a flat portion having the at least one magnet; and when the base portion of the first wrench is stacked on top of the base portion of the second wrench and the base portion of the second wrench is stacked on top of the second elongated base portion of the third wrench, the first magnet or the second magnet retains the first wrench to the second wrench, and the first magnet or the at least one magnet of the third wrench retains the second wrench to the third wrench.

18. The nested locknut wrench system of claim 17, wherein when the first wrench, the second wrench, and the third wrench are stacked and retained to each other with the base portions of each wrench in alignment with each other, the magnets of the first wrench, second wrench, and third wrench are offset from each other.

19. The nested locknut wrench system of claim 12, wherein the first plane is between the third plane and the fifth plane.

* * * * *